United States Patent Office 3,431,268
Patented Mar. 4, 1969

3,431,268
2,5-BIS(PYRIDYLETHYL)PYRROLES
John L. Archibald, Malvern, Pa., assignor to American Home Products Corporation, New York, N.Y., a corporation of Delaware
No Drawing. Filed Oct. 19, 1965, Ser. No. 498,109
U.S. Cl. 260—293    15 Claims
Int. Cl. C07d 57/00; A16k 17/00

ABSTRACT OF THE DISCLOSURE

The compounds are 2,5 - bis(pyridylethyl)pyrroles which may be additionally substituted in the 1, 3, and 4 positions, and their acid-addition salts, and are useful as hypotensive agents. The compounds may be prepared by direct C-pyridylethylation of a suitable pyrrole with a 2- or 4-vinyl pyridine compound, in an acid medium, under an inert atmosphere.

---

This invention relates to new and useful chemical compounds that are derivatives of pyrroles and, more particularly, to 2,5-bis(pyridylethyl)pyrroles, and their salts, and to methods for producing them.

The novel compounds encompassed by the invention, in the form of their free bases, may be represented by the following general formula:

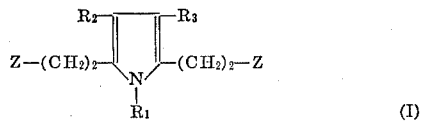

(I)

wherein $R_1$, $R_2$ and $R_3$ may or may not be the same and are selected from the group consisting of hydrogen, alkyl, aralkyl, aminoalkyl, aryl, acyl, aroyl, and carbalkoxy; Z is selected from the group consisting of 2- and 4-pyridyl and 2- and 4-piperidyl, wherein the pyridyl or piperidyl moiety optionally may be further substituted by lower alkyl.

It has been discovered that compounds meeting the described qualifications, whether as free bases or the acid-addition salts thereof, have useful pharmacological properties. More particularly, said compounds have been found to exhibit cardiovascular activity and have been found to be useful as hypotensive and antiarrhythmic agents.

The pyridyl-substituted pyrrole derivatives of the invention, in the form of the free bases, may generally be prepared by a novel C-pyridylethylation procedure which comprises refluxing a suitable pyrrole compound; i.e., one that is unsubstituted at the 2,5-positions, with a 2- or 4-vinyl pyridine compound, in an acid medium, under an inert atmosphere, and then recovering the resultant compound by standard procedures known to the art. In accordance with the process aspects of the invention, C-substitution at the 2,5-positions of the pyrrole nucleus occurs rather than on the nitrogen atom at the 1-position, as would normally be expected. Where substitution on the nitrogen atom of the pyrrole moiety of the compounds of the invention is desired, this may be obtained conveniently by forming the sodium salt of the product of the aforesaid C-pyridylethylation procedure, as by slow addition to a cold solution of sodium hydride in dimethylformamide, for example, and then reacting the obtained salt with a suitable organic halide for furnishing the desired organic substituent on said nitrogen atom. In an alternative method for obtaining the final compounds of the invention wherein a substituent on the nitrogen atom of the pyrrole moiety thereof is present, the pyrrole derivative used in the C-pyridylethylation procedure may simply be selected to have such substituent prior to said procedure, to obviate the necessity for introducing the substituent at a later time as is done in the method described just previously. To obtain the corresponding piperidyl-substituted compounds of the invention, the pyridyl-substituted pyrrole analogs are prepared and then may be hydrogenated in the presence of a suitable catalyst such as platinum oxide.

As indicated hereinbefore, compounds falling within the general Formula I above may be used in the form of their acid-addition salts while still retaining their effectiveness for cardiovascular use. The salts may provide greater flexibility in therapeutic use since they may impart various degrees of water-solubility to an otherwise substantially insoluble base. With regard to the acid-addition salts, either organic or inorganic acids may be used for preparing them as long as said acids do not substantially increase the toxicity of the compound. Among the pharmaceutically-acceptable acid-addition salts considered useful for the purposes indicated, are, for example, hydrochlorides, sulphates, phosphates, hydrobromides, acetates, tartrates, propionates, sulfonates, and the like.

The acid-addition salts of the novel free bases may be prepared by procedures now well known to those skilled in the art. For example, a selected novel free base may generally be dissolved in a suitable solvent and the selected acid may then be added thereto. Since the preparation of acid-addition salts is so well known, it need not be described in any greater detail here.

When the compounds of the invention are employed as cardiovascular agents, they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk, sugar, certain types of clay and so forth. They may be administered sublingually in the form of troches or lozenges in which the active ingredient is mixed with sugar and corn syrups, flavoring agents and dyes; and then dehydrated sufficiently to make it suitable for pressing into a solid form. They may be administered orally in the form of solutions which may contain coloring and flavoring agents or they may be injected parenterally, that is intramuscularly, intravenously or subcutaneously. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until this optimum effect under the circumstances is reacted. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects and preferably at a level that is in the range of from about 0.5 mg. to about 100 mg. per kg. of body weight per day, although as aforementioned, variations will occur. However, a dosage level that is in the range of from about 1 mg. to about 50 mg. per kg. of body weight per day is most desirably employed in order to achieve effective results.

The following examples are given by way of illustration and are not to be construed as limitations of this invention, many variations of which are possible without departing from the scope and spirit thereof.

EXAMPLE I 2,5-bis[2-(4-pyridyl)ethyl]pyrrole

Pyrrole (6.7 g.), 4-vinylpyridine (10.5 g.) and acetic acid (25 ml.) were mixed under nitrogen and refluxed for 30 min. The cooled mixture was added slowly dropwise to vigorously stirred ice-water containing sodium carbonate (50 g.). The colorless precipitate (8.3 g.) was collected, washed well, dried and recrystallized from ethanol-water. Two further recrystallizations gave the product as a hydrate, M.P. 102–6° (123–4° after drying at 56°/.01 mm.).

Analysis.—Calcd. for $C_{18}H_{19}N_3 \cdot H_2O$: C, 73.19; H, 7.17; N, 14.23. Found: C, 73.01; H, 7.47; N, 14.33.

EXAMPLE II 1-methyl-2,5-bis[2-(4-pyridyl)ethyl]pyrrole 1-methylpyrrole (40.5 g.) and 4-vinyl pyridine (105 g.) in acetic acid (100 ml.) were refluxed under $N_2$ for 16 hrs. Acetic acid was removed in vacuo and the residue was dissolved in ether and extracted with 2 N hydrochloric acid. The acid extracts were combined, basified and kept at 0° for 24 hr. A gummy solid resulted which was filtered off and washed with a little 50% ethanol. Two recrystallizations from ethanol provided the product as colorless needles (23 g.), M.P. 125–6°.

Analysis.—Calcd. for $C_{19}H_{21}N_3$: C, 78.31; H, 7.26; N, 14.42. Found: C, 78.37; H, 7.29; N, 14.25.

EXAMPLE III 1-phenethyl-3-ethyl-4-methyl-2,5-bis[2-(4-pyridyl)ethyl]pyrrole

Following the general procedure of Example I, and utilizing as the pyrrole derivative, 3-ethyl-4-methylpyrrole, for reaction with 4-vinylpyridine in acetic acid, followed by formation of the pyrrole sodium salt and reaction with phenethyl bromide; the title compound is obtained.

EXAMPLE IV 1-p-chlorobenzoyl-3-methyl-2,5-bis[2-(2-pyridyl)ethyl]pyrrole

Following the general procedure of Example I, and utilizing as the pyrrole derivative, 3-methylpyrrole, for reaction with 2-vinylpyridine, followed by formation of the sodium salt and reaction with p-chlorobenzoyl chloride; the title compound is obtained.

EXAMPLE V 2,5-bis[2-(4-piperidyl)ethyl]pyrrole 2,5-bis[2-(4-pyridyl)ethyl]pyrrole, (3.2 g.) obtained by the procedure of Example I, was suspended in a mixture of water (10 ml.) and ethanol (8 ml.) and made just acid with concentrated hydrochloric acid; whereupon the suspension dissolved. Platinum oxide (0.5 g.) was added and the mixture was hydrogenated for 5 hrs. at 47 p.s.i. initial pressure. The catalyst was filtered off and the ethanol was distilled from the filtrate at reduced pressure. The residue was diluted with water, cooled in an ice-bath, and made strongly basic with sodium hydroxide. A colorless solid precipitated which was collected, washed with water and dried. Two recrystallizations from aqueous ethanol provided the title compound (1.7 g.) as colorless needles M.P. 108–112°.

Analysis.—Calcd. for $C_{18}H_{31}N_3$: C, 74.69; H, 10.80; N, 14.52. Found: C, 74.45; H, 10.71; N, 14.72.

EXAMPLE VI 2,5-bis[2-(3-methyl-2-pyridyl)ethyl]pyrrole

Following the general procedure of Example I, and utilizing as the pyridyl derivatives, 3-methyl-2-vinylpyridine; the title compound is obtained.

EXAMPLE VII 2,5-bis[2-(5-ethyl-2-pyridyl)ethyl]pyrrole

Following the general procedure of Example I, and utilizing as the pyridyl derivative, 5-ethyl-2-vinylpyridine; the title compound is obtained.

EXAMPLE VIII 2,5-bis[2-(3-ethyl-2-piperidyl)ethyl]pyrrole

Following the general procedure of Example V, but employing 2,5-bis[2-(3-methyl - 2 - pyridyl)ethyl]pyrrole, which has previously been prepared by the general procedure of Example I; the title compound is obtained.

I claim:

1. A compound of the formula:

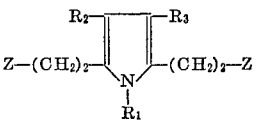

wherein $R_1$ is selected from the group consisting of hydrogen, lower alkyl, phenyl(lower)alkyl, benzoyl, and halobenzoyl; $R_2$ and $R_3$ are each selected from the group consisting of hydrogen and lower alkyl; and Z is selected from the group consisting of pyridyl and piperidyl moieties which have one of the following structures:

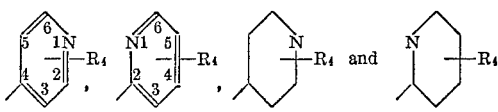

wherein $R_4$ is selected from the group consisting of hydrogen and lower alkyl.

2. 2,5-bis[2-(4-pyridyl)ethyl]pyrrole.
3. 1-methyl-2,5-bis[2-(4-pyridyl)ethyl]pyrrole.
4. 1-phenethyl - 3 - ethyl - 4 - methyl - 2,5 - bis[2 - (4-pyridyl)ethyl]pyrrole.
5. 1 - p - chlorobenzoyl - 3 - methyl - 2,5 - bis[2 - (2-pyridyl)ethyl]pyrrole.
6. 2,5-bis[2-(4-piperidyl)ethyl]pyrrole.
7. 2,5-bis[2-(3-methyl-2-pyridyl)ethyl]pyrrole.
8. 2,5-bis[2-(5-ethyl-2-pyridyl)ethyl]pyrrole.
9. 2,5-bis[2-(3-methyl-2-piperidyl)ethyl]pyrrole.
10. A method of pyridylethylation of pyrroles which comprises refluxing a pyrrole of the formula:

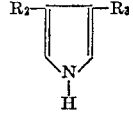

wherein $R_2$ and $R_3$ are each selected from the group consisting of hydrogen and lower alkyl, with a vinyl pyridine compound selected from the group which has one of the following structures:

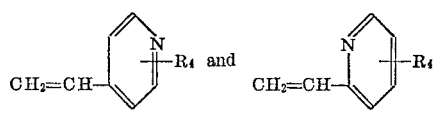

wherein $R_4$ is selected from the group consisting of hydrogen and lower alkyl, in an acid medium, and recovering from said medium a C-pyridylethylated pyrrole of the formula:

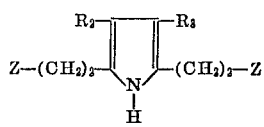

wherein $R_2$ and $R_3$ have the same meaning as above;

and Z is a pyridylethyl moiety selected from the group which has one of the following structures:

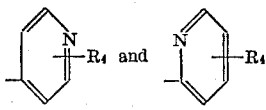

wherein $R_4$ has the same meaning as above.

11. A method of preparing pyrrole derivatives of the formula:

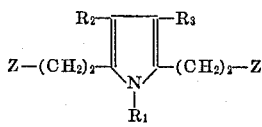

wherein $R_1$ is selected from the group consisting of lower alkyl, phenyl, phenyl(lower)alkyl, benzoyl, and halobenzoyl; $R_2$ and $R_3$ are each selected from the group consisting of hydrogen and lower alkyl; and Z is selected from the group consisting of pyridyl moieties which have one of the following structures:

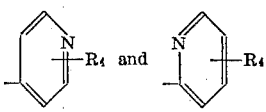

wherein $R_4$ is selected from the group consisting of hydrogen and lower alkyl; which method comprises the method of pyridylethylation as defined in claim 10, followed by introduction of a sodium atom on the nitrogen atom thereby transforming the resulting base to the sodium salt thereof, and then reacting said sodium salt with a compound of the formula:

wherein $R_1$ has the same meaning as above, and X is halogen.

12. A method of preparing pyrrole derivatives of the formula:

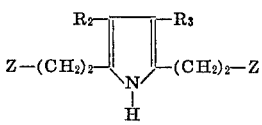

wherein $R_2$ and $R_3$ are each selected from the group consisting of hydrogen and lower alkyl; and Z is selected from the group consisting of piperidyl moieties which have one of the following structures:

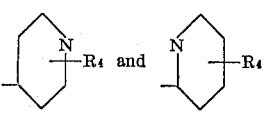

wherein $R_4$ is selected from the group consisting of hydrogen and lower alkyl; which method comprises the method of pyridylethylation as defined in claim 10, followed by hydrogenation of the resulting pyridylethylated pyrrole derivative to the corresponding piperidylethylated pyrrole derivative.

13. A method of preparing pyrrole derivatives of the formula:

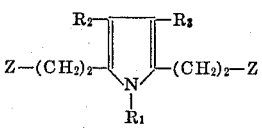

wherein $R_1$ is selected from the group consisting of lower alkyl, phenyl, phenyl(lower)alkyl, benzoyl and halobenzoyl; $R_2$ and $R_3$ are each selected from the group consisting of hydrogen and lower alkyl; and Z is selected from the group consisting of piperidyl moieties which have one of the following structures:

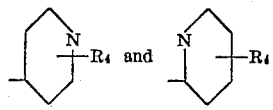

wherein $R_4$ is selected from the group consisting of hydrogen and lower alkyl; which method comprises the method of pyridylethylation and hydrogenation as defined in claim 12, wherein the H atom on the nitrogen atom of the pyrrole moiety is substituted by an Na atom to form the sodium salt, and then said sodium salt is reacted with a compound of the formula $R_1X$, wherein $R_1$ has the same meaning as above.

14. A method of pyridylethylation of pyrroles which comprises refluxing a pyrrole of the formula:

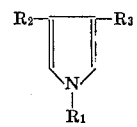

wherein $R_1$ is selected from the group consisting of hydrogen, lower alkyl, phenyl, phenyl(lower)alkyl, benzoyl and halobenzoyl; and $R_2$ and $R_3$ are each selected from the group consisting of hydrogen and lower alkyl, with a vinyl pyridine compound selected from the group which has one of the following structures:

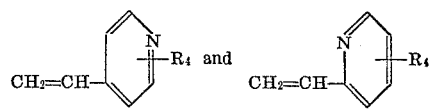

wherein $R_4$ is selected from the group consisting of hydrogen and lower alkyl, in an acid medium, and recovering from said medium a C-pyridylethylated pyrrole of the formula:

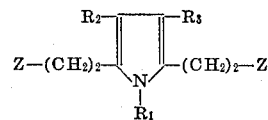

wherein $R_1$, $R_2$ and $R_3$ have the same meaning as above; and Z is a pyridylethyl moiety selected from the group which has one of the following structures:

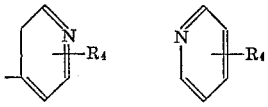

wherein $R_4$ has the same meaning as above.

15. A method of preparing pyrrole derivatives of the formula:

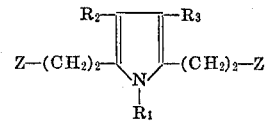

wherein $R_1$ is selected from the group consisting of hydrogen, lower alkyl, phenyl(lower)alkyl, benzoyl and halobenzoyl; $R_2$ and $R_3$ are each selected from the group consisting of hydrogen and lower alkyl; and Z is selected from the group consisting of piperidyl moieties which have one of the following structures:

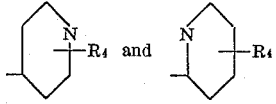

wherein $R_4$ is selected from the group consisting of hydrogen and lower alkyl; which method comprises the method of pyridylethylation as defined in claim 14, followed by hydrogenation of the resulting pyrrole pyridylethylated pyrrole derivative to the corresponding piperidyl-ethylated pyrrole derivative.

References Cited

UNITED STATES PATENTS 2,488,336  11/1949  Scott _____ 260—313.1
2,830,057  4/1958  Hoffmann et al. _____ 260—293

OTHER REFERENCES

Berichte, vol. 92, No. 6, pp. 1363–64, Buchta et al.

HENRY R. JILES, *Primary Examiner.*

E. D. LEWIS, *Assistant Examiner.*

U.S. Cl. X.R.

260—293.2, 294, 295, 296, 999